United States Patent
Weber et al.

[19]

[11] Patent Number: 6,113,038
[45] Date of Patent: Sep. 5, 2000

[54] SUPPORT FOR CONDUIT

[75] Inventors: Oliver Weber, Grosshabersdorf; Reiner Brehm, Nuermberg, both of Germany

[73] Assignee: ABB Daimler-Benz Transportation (Technology) GmbH, Germany

[21] Appl. No.: 09/180,600

[22] PCT Filed: Mar. 7, 1998

[86] PCT No.: PCT/EP98/01343

§ 371 Date: Feb. 24, 1999

§ 102(e) Date: Feb. 24, 1999

[87] PCT Pub. No.: WO98/41788

PCT Pub. Date: Sep. 24, 1998

[30]     Foreign Application Priority Data

Mar. 14, 1997 [DE] Germany .......................... 197 10 658

[51] Int. Cl.$^7$ .................................................. E21F 17/02
[52] U.S. Cl. ................................ 248/62; 248/65; 248/74.1
[58] Field of Search .................................. 248/74.4, 74.1, 248/61, 62, 72, 67.7, 63, 58, 53; 137/347; 213/76; 285/24, 63

[56]     References Cited

U.S. PATENT DOCUMENTS

| | | | |
|---|---|---|---|
| 2,375,513 | 5/1945 | Bach ......................................... | 248/57 |
| 3,650,499 | 3/1972 | Biggane .................................... | 248/62 |
| 4,267,994 | 5/1981 | Lynch et al. ............................. | 248/65 |
| 4,516,296 | 5/1985 | Sherman ........................... | 248/74.1 X |
| 4,714,218 | 12/1987 | Hungerford, Jr. ......................... | 248/62 |

FOREIGN PATENT DOCUMENTS

| | | |
|---|---|---|
| 291292 | 9/1953 | Switzerland . |
| 2059493 | 4/1981 | United Kingdom . |

*Primary Examiner*—Ramon O. Ramirez
*Assistant Examiner*—Gwendolyn Baxter
*Attorney, Agent, or Firm*—Webb Ziesenheim Logsdon Orkin & Hanson, P.C.

[57]     ABSTRACT

A support or holder for at least one line is surrounded by two holding clamps that can be clamped together by the application of tension. To achieve a simple construction and a high degree of flexibility with regard to the position and the cross section of the lines, there is a holding rail that can be formed for a plurality of pairs of holding clamps, whereby each two symmetrically curved holding clamps enclose a line between their concave facing sides in a form-fitting or frictional manner.

20 Claims, 3 Drawing Sheets

SUPPORT FOR CONDUIT

BACKGROUND OF THE INVENTION

1. Field of the Invention

The present invention relates to a holder more particularly to a support for pipelines, electrical lines, cables and the like.

2. Description of the Prior Art

For pipelines or electrical lines, the prior art in general provides the use of holding clamps that have one or more recesses and that grip or surround one or more lines that run parallel to one another. After the corresponding line has been introduced into the respective recess, such holding clamps are affixed to a support element by means of tensioning means such as screws, rivets etc. One disadvantage of this construction is that the holder has a fixed and defined number of ways in which potential lines can be fastened, and also defines their three-dimensional arrangement in relation to one another.

The object of the invention is to provide a support in which holding clamps of different sizes can be used as required, and/or their location and orientation in relation to one another can be changed.

In one embodiment of a support or holder as disclosed by the invention, the use of a long holding rail and holding clamps mounted on it so that they are arranged in pairs with one another and can be displaced makes it possible to fasten different lines in any desired sequence over the available width of the holding rail. The holding clamps can thus be pushed onto the holding rail in pairs of suitable sizes in a flexible arrangement, corresponding to the arrangement of the lines being supported. Because the pairs of holding clamps also consists of separate individual clamps, the lines can also be inserted on an existing support element, in particular in a holder that as been pre-installed on a wall of a railway vehicle, radially between the expandable pairs of clamps that sit radially on the holding rail. The pairs of clamps that go together are then connected together on their free ends by tensioning means, in particular bolt/nut connections. If the diameter or the circle that surrounds this diameter is equal to or larger than the circle that can be inscribed in the area enclosed between two holding clamps of a pair and the holding rail, then the line is at least frictionally fixed between the corresponding holding clamps and the relevant segment of the holding rail, whereby a force component is then created that presses the edges of the notches that reach around behind the holding rail against the backside of the holding rail, and thus secures the holding clamps to prevent them being displaced on the holding rail. On its ends, the holding rail preferably has a passage that lies outside the longitudinal portion surrounded by the holding clamps, so that it can be securely fastened to a support element, thereby preventing a lateral sliding of holding clamps. The holding rail preferably has a rectangular cross section which is adapted to the corresponding notch in the U-legs of the holding clamps. In that case, however, the notches are somewhat larger than the dimensions of the holding rail, to guarantee that they can be displaced easily along the holding rail. At the same time, the holding clamps can also thereby be tipped to a limited extent with respect to the holding rail, so that for the radial insertion of the lines between two corresponding, symmetrically bent holding clamps with their concave sides facing one another and which complement one another to form a "U", these holding clamps do not need to be pushed as far onto the holding rail as required by the diameter of the respective line. The free ends of the holding clamps can stand perpendicular to the longitudinal axis of the holding rail or parallel to the plane containing the notches in the U-legs, and point away from the holding rail, so that tensioning means can be engaged which apply tension to these terminal segments and thus to the holding clamps themselves toward one another and thereby generate the force required for the clamping of the inserted line. For this purpose, these terminal segments can have borings for a screw with a nut, for a rivet or similar tensioning means, which borings run parallel to the holding rail or to the axis of the notches. The available length of the holding rail can thereby be greater than required by the number of pairs of holding clamps, so that the position of the holding clamps can be adjusted to the position of the respective cable or tube being supported. A railway vehicle in which a holder realized in this manner can be used can, on a wall element, support a C-profile rail, in which there is a hammer-shaped fastening anchor that can be displaced in the longitudinal direction of the C-profile rail, and which acts as the guidance and fastening element, to hold the holding rail in a frictional contact with the C-profile rail.

The invention is explained in greater detail below with reference to the exemplary embodiment illustrated in the accompanying drawings.

DETAILED DESCRIPTION OF THE PREFERRED EMBODIMENTS

Figure 3:
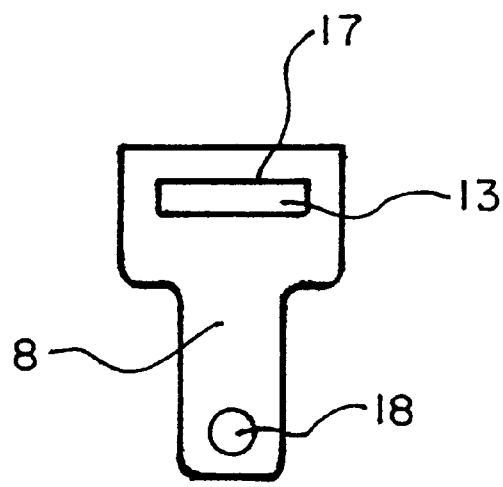
FIG. 3 is a side view of a holding clamp of the present invention.

A wall element 1 in the form of an extruded profile of a railway vehicle which is not illustrated in any further detail is equipped with a C-profile rail 2, which extends at least over a portion of the length of the wall element 1. Engaged in the C-profile rail 2 is the head 3 of a fastening anchor 4 having a hammer-shaped cross section and which in this case is realized in the form of a cap screw with a nut 5. The fastening anchor 4 runs through a penetration 6 in a holding rail 7 that is oriented at a right angle to the longitudinal direction of the C-profile rail. The penetration 6 is thereby located on a flat end of the holding rail 7, but outside the length area of the holding rail 7 on which the pairs of holding clamps 8, 9 are located. Each pair of holding clamps 8, 9 is provided for the fastening of a line 10, which can be a pipe, a cable or a similar object. The holding clamps 8, 9, shown in isolation in FIGS. 3 and 4, are curved symmetrically and face one another with their concave sides, so that between these holding clamps 8, 9 and the corresponding segment of the holding rail 7, there remains a free area which can contain the cross section of the line 10.

Figure 1:
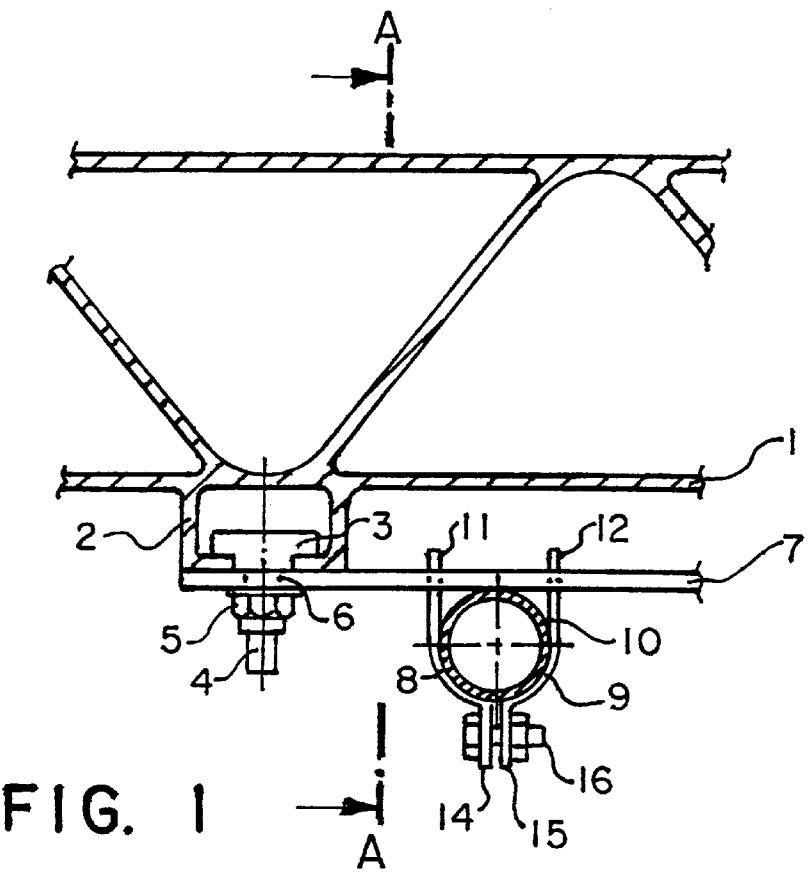
FIG. 1 is a holder on a wall element with a line held in place.
Figure 2:
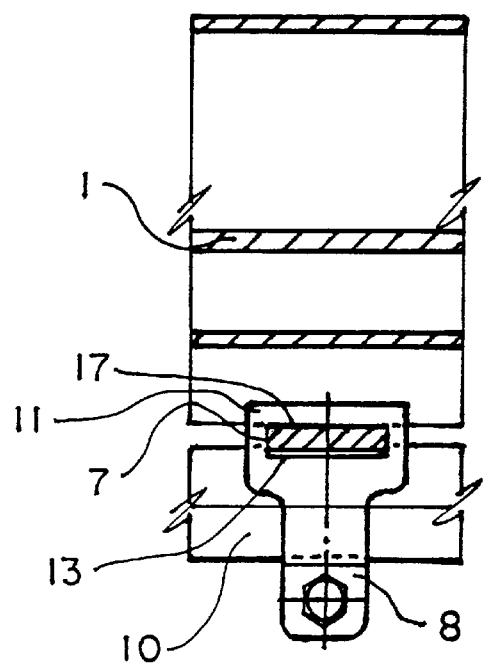
FIG. 2 is an illustration is a lateral cross sectional view along line A—A of the system illustrated in FIG. 1.
Figure 4:
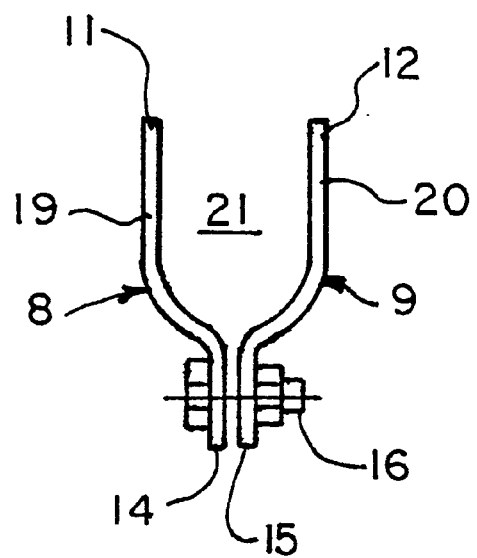
FIG. 4 is a front view of a pair of holding clamps of the present invention.

When the system is assembled, the holding clamps 8, 9 form a U-shape, shown generally as element 21 of FIG. 4, with terminal areas 11, 12 that run parallel to one another which form the free U-legs shown generally as element 19 and 20 of the U-shape. The terminal areas 11, 12 project at a right angle to the longitudinal axis of the holding rail 7 and also at a right angle to the longitudinal axis of the U-shape or of the inserted line 10, and each have a notch 13, through which the common holding rail 7 is engaged. The preferably closed notch 13 seat is sized so that the holding clamps 8, 9 can be pushed unhindered onto the holding rail 7 and if necessary can be tipped to a certain extent as a result of the radial clearance. In the functional position, the terminal segments 14 and 15 of the respective holding clamps 8, 9 facing away from the holding rail 7 are held together by means of tensioning means 16, as illustrated in FIG. 1.

A plurality of pairs of holding clamps 8, 9 sized to correspond to the diameter of the lines 10 can be pushed onto the holding rail 7, depending on the available length. The distance between the pairs of holding clamps can thereby be adjusted as necessary, and can be varied according to the position of the lines 10 being supported. The holding clamps 8, 9 must thereby be sized and arranged so that in the bolted-together position illustrated in FIG. 1, they are in contact by means of their segments running toward one another against the periphery of the respective line 10, and thereby push this line 10 against he holding rail 7. The line 10 is thereby secured to prevent axial displacement, and simultaneously the notch edges 17 that grip the back of the holding rail come into frictional contact with the holding rail 7. The displacement of the pair of holding clamps along the holding rail 7 is thereby also prevented. The area enclosed between two corresponding holding clamps 8, 9 and the holding rail 7 thereby contains an inscribed circle that, when the holding clamps 8, 9 are bolted together, is at most equal to or smaller than the cross section of a line 10 that is introduced between the holding clamps 8, 9.

The plane segments of the U-legs 11, 12 extend to approximately the cross section center line running perpendicular to them of the corresponding line 10, while the adjacent curved segments run toward one another, as a function of the diameter of the line 10. The adjacent terminal segments 14, 15 that face away from the holding rail 7 run parallel to the plane that contains the notches 13 and point away from the holding rail 7, so that the space enclosed between the holding clamps 8, 9 remains free for the insertion of the line 10. The terminal segments 14, 15 to which the tension is applied, and which are usually at some distance from one another, have a boring that runs parallel to the holding rail 7 or to the axis of the notches 13, whereby the tensioning means consisting of a bolt and nut, a rivet or a similar means is engaged through the borings thus created. With these tensioning means 16, the terminal segments 14, 15 are brought close together until a sufficient compression force is exerted on the line 10 to prevent any unintentional displacement in the radial and axial directions.

Figure 5:
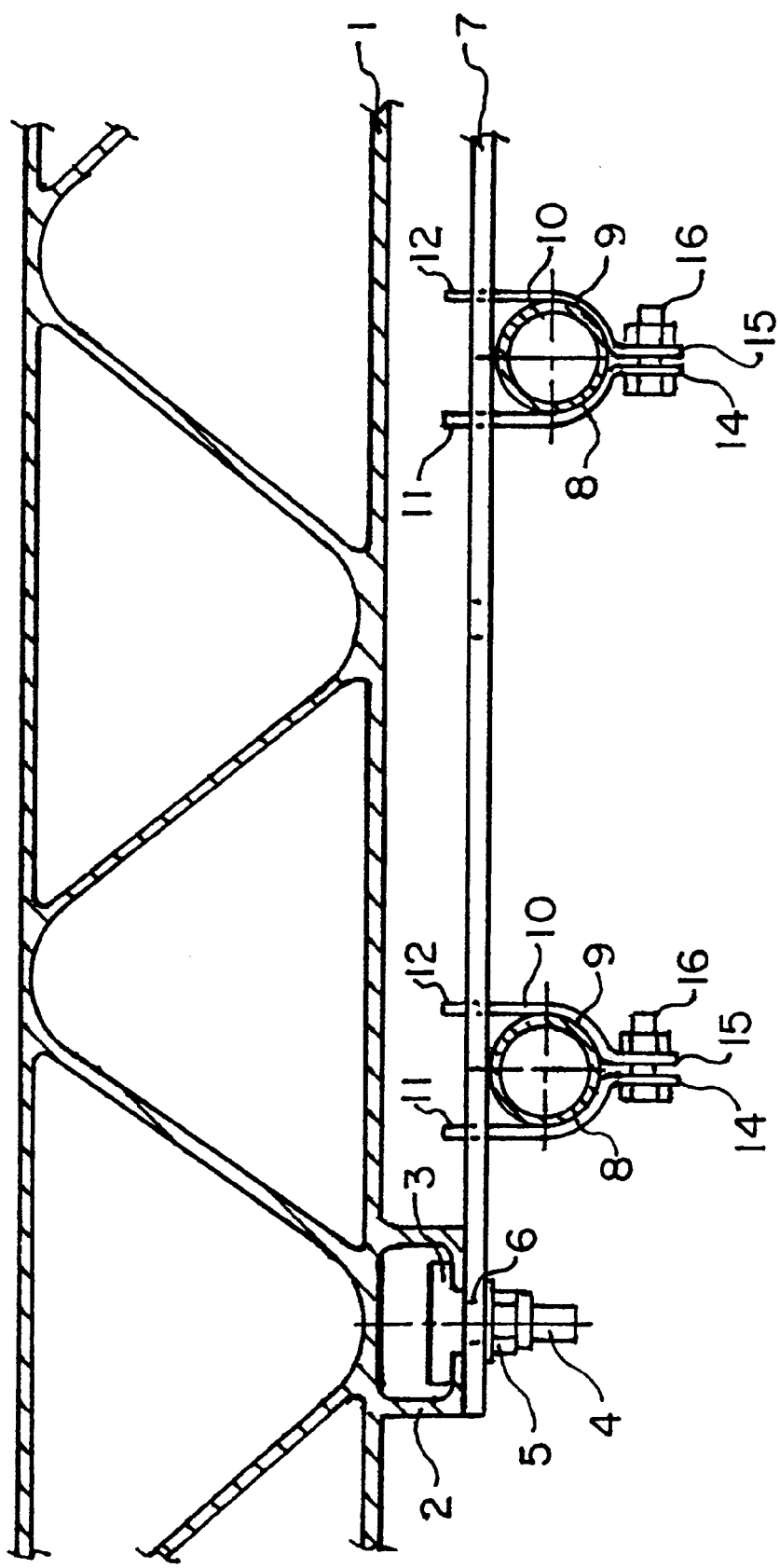
FIG. 5 is a front view of a pair of holding clamps on a wall element with a pair of lines held in place according to the present invention.

A holder constructed in this manner offers a high degree of flexibility with regard to the ability to hold and retain different lines 10 at the desired points along the holding rail 7, such as shown in FIG. 5. The holder is also easy to install and when both ends of the holding rail are secured, offers a high level of strength and captivity of the individual parts, while remaining economical and lightweight. Lines of different thicknesses can thereby be fastened to the holding rail in any desired sequence. Such a holder is also particularly well suited for use in a railway vehicle with wall elements made of extruded profiles, on which there can also be a profile rail, in particular a C-shaped profile rail, to which the holder can be frictionally fastened in any desired position along the profile rail.

What is claimed is:

1. A holder for mounting lines on walls of railway vehicles, comprising holding clamps that at least partly surround at least one line and at least one tensioning means that holds the holding clamps together, wherein for each of the lines there are two holding clamps that are symmetrically curved and have concave sides facing one another, the holding clamps, when assembled, form a U-shape having U-legs, the U-legs having terminal areas, wherein the terminal areas of the holding clamps are provided at a right angle to a longitudinal axis of the U-shape with at least one closed slot, wherein a common holding rail runs through the at least one slot with radial clearance, and wherein terminal segments of the holding clamps facing away from the holding rail are held together by the at least one tensioning means.

2. The holder as claimed in claim 1, wherein a plurality of pairs of holding clamps on the holding rail are positioned adjacent to one another in a longitudinal direction of the rail.

3. The holder as claimed in claim 2, wherein the holding rail has at least one penetration outside a longitudinal area surrounded by the holding clamps.

4. The holder as claimed in claim 2, wherein the holding rail has a rectangular cross section and the at least one slot in the U-legs of the holding clamps matches the cross sectional shape of the holding rail.

5. The holder as claimed in claim 2, wherein the terminal segments of the holding clamps facing away from the holding rail are oriented substantially parallel to a plane that contains the at least one slot and face away from the holding rail.

6. The holder as claimed in claim 2, wherein when the holding clamps are clamped together, a circle inscribed in the area between the holding clamps and the holding rail is equal to or smaller than a cross section of the at least one line introduced between the holding clamps.

7. The holder as claimed in claim 1, wherein the holding rail has a rectangular cross section and the at least one slot in the U-legs of the holding clamps matches the cross sectional shape of the holding rail.

8. The holder as claimed in claim 7, wherein the terminal segments of the holding clamps facing away from the holding rail are oriented substantially parallel to a plane that contains the at least one slot and face away from the holding rail.

9. The holder as claimed in claim 1, wherein the terminal segments of the holding clamps facing away from the holding rail are oriented substantially parallel to a plane that contains the at least one slot and face away from the holding rail.

10. The holder as claimed in claim 1, wherein the terminal segments have borings that run substantially parallel to the holding rail for receiving the at least one tensioning means.

11. The holder as claimed in claim 10, wherein the at least one tensioning means includes a bolt and nut combination or a rivet.

12. The holder as claimed in claim 1, wherein when the holding clamps are clamped together, a circle inscribed in the area between the holding clamps and the holding rail is equal to or smaller than a cross section of the at least one line introduced between the holding clamps.

13. The holder as claimed in claim 1, wherein the holding rail has a length which is a multiple of a distance between the U-legs of a pair of holding clamps.

14. The holder as claimed in claim 1, wherein the at least one line includes pipelines, electrical lines and cables.

15. The holder as claimed in claim 1, wherein the terminal segments have borings that run substantially parallel to an axis of the at least one slot for receiving the at least one tensioning means.

16. The holder as claimed in claim 15, wherein the at least one tensioning means includes a bolt and nut combination or a rivet.

17. A holder for mounting lines on the wall of railway vehicles, comprising holding clamps that at least partly surround at least one line and at least one tensioning means that holds the holding clamps together, wherein for each of the lines there are two holding clamps that are symmetrically curved and have concave sides facing one another, the holding clamps, when assembled, form a U-shape having U-legs, the U-legs having terminal areas, wherein the terminal areas of the holding clamps are provided at a right angle to a longitudinal axis of the U-shape with at least one notch wherein a common holding rail runs through the notches with radial clearance, and wherein terminal segments of the holding clamps facing away from the holding rail are held together by the at least one tensioning means, and wherein the holding rail has at least one penetration outside a longitudinal area surrounded by the holding clamps.

18. The holder as claimed in claim 12 wherein the holding rail has a rectangular cross section and the at least one notch in the U-legs of the holding clamps matches the cross sectional shape of the holding rail.

19. The holder as claimed in claim 12, wherein the terminal segments of the holding clamps facing away from the holding rail are oriented substantially parallel to a plane that contains the notches and face away from the holding rail.

20. A holder for mounting lines on the wall of railway vehicles, comprising holding clamps that at least partly surround at least one line and at least one tensioning means that holds the holding clamps together, wherein for each of the lines there are two holding clamps that are symmetrically curved and have concave sides facing one another, the holding clamps, when assembled, form a U-shape having U-legs, the U-legs having terminal areas, wherein the terminal areas of the holding clamps are provided at a right angle to a longitudinal axis of the U-share with at least one notch wherein a common holding rail runs through the notches with radial clearance, and wherein terminal segments of the holding clamps facing away from the holding rail are held together by the at least one tensioning means, wherein the holder is connected to a wall of a railway vehicle, the wall having a C-shaped profile rail connected thereto, the C-shaped profile rail having a fastening anchor having a hammer-shaped cross section, the fastening anchor movable in a longitudinal direction of the C-profile, the fastening anchor holding the holding rail in frictional contact with the C-shaped profile rail.

* * * * *